United States Patent

Roloff et al.

[11] Patent Number: 5,992,001
[45] Date of Patent: Nov. 30, 1999

[54] METHOD AND APPARATUS FOR CONNECTING BILLETS

[75] Inventors: Wolfgang Roloff, Mönchengladbach; Hans-Georg Hartung, Pulheim; Friedrich Wilhelm Hollmann, Grevenbroich; Paul-Josef Mauk, Düsseldorf, all of Germany

[73] Assignee: SMS Schloemann-Siemag AG, Dusseldorf, Germany

[21] Appl. No.: 08/989,713

[22] Filed: Dec. 12, 1997

[30] Foreign Application Priority Data

Dec. 14, 1996 [DE] Germany .......................... 196 52 088

[51] Int. Cl.⁶ .............................. B21B 1/46; B21B 15/00
[52] U.S. Cl. ...................... 29/527.5; 29/33 C; 164/417; 164/418; 164/419; 164/459; 164/476; 228/5.7
[58] Field of Search ............................... 29/33 C, 527.5, 29/527.7; 164/108, 263, 459–461, 417–419, 476–477; 228/5.7

[56] References Cited

U.S. PATENT DOCUMENTS

| | | | |
|---|---|---|---|
| 4,566,526 | 1/1986 | Fastert et al. | 164/478 |
| 4,577,384 | 3/1986 | Bricmont | 29/460 |
| 5,398,745 | 3/1995 | Cook | 164/120 |

FOREIGN PATENT DOCUMENTS

| | | |
|---|---|---|
| 36 36 785 | 5/1988 | Germany . |
| 54-001264 | 1/1979 | Japan . |
| 56-119659 | 9/1981 | Japan . |
| 60-231502 | 1/1985 | Japan . |
| 60-024201 | 2/1985 | Japan . |
| 60-213383 | 10/1985 | Japan . |
| 61-176488 | 8/1986 | Japan . |
| 5 -277664 | 10/1993 | Japan . |

OTHER PUBLICATIONS

1 Search Report.

*Primary Examiner*—P. W. Echols
*Attorney, Agent, or Firm*—Herbert Dubno; Andrew Wilford

[57] ABSTRACT

A continuously cast strand is cut into elongated billets having ends and the billets are run through a rolling stand. after cutting the strand into billets and before rolling the billets one of the billets is engaged in the rolling stand and a trailing end of the one billet and a leading end of another billet are enclosed in a mold with the ends longitudinally spaced. This space between the ends is filled with molten metal in contact with the ends of the billets and the molten metal is hardened to interconnect the billet ends. Then the mold is removed from around the billet ends. The molten metal is of substantially the same composition as the billets. Furthermore the one billet is advanced in a travel direction by means of the stand and the mold and the other billet are advanced synchronously with the one billet after enclosing the billet ends in the mold. The mold is removed from the billet ends before the hardened metal between the billet ends enters the rolling stand.

10 Claims, 2 Drawing Sheets

METHOD AND APPARATUS FOR CONNECTING BILLETS

FIELD OF THE INVENTION

The present invention relates to the rolling of billets. More particularly this invention concerns a method of and apparatus for rolling billets cut from a continuously cast strand.

BACKGROUND OF THE INVENTION

In the production of bars, for instance steel rein-forcement bars, it is standard to continuously cast a metal strand, cut it into relatively long billets, roll the billets into bars of the desired sectional shape, and finally to cut the bars into the desired trade lengths. The strand is cut into billets because it is virtually impossible to deal with the extremely long strand as it exits the continuous-casting apparatus. Normally also the rolling mill is not located close enough to receive the continuously cast strand directly and in any case the low speed of the rolling mill cannot match the outlet speed of the strand from the continuous caster.

The billets are normally of a standardized length that is in turn a multiple of a desired finish trade length, corrected of course for the length increase encountered with rolling, but the last billet produced from a continuously cast strand is invariably shorter than this desired trade length. This short piece creates a problem that is dealt with, for instance, in the system of German patent document 3,636,785 by cutting it to a length equal to a multiple of the desired finish length before further treatment. Although such a procedure is a substantial improvement on the procedure of simply manually culling out and recycling the overshort piece it is relatively complex and requires special equipment.

OBJECTS OF THE INVENTION

It is therefore an object of the present invention to provide an improved method of and apparatus for rolling billets.

Another object is the provision of such an improved method of and apparatus for rolling billets which overcomes the above-given disadvantages, that is which eliminates the problem of odd-length billets in a rolling operation.

SUMMARY OF THE INVENTION

A continuously cast strand is cut into elongated billets having ends and the billets are run through a rolling stand. According to the invention after cutting the strand into billets and before rolling the billets one of the billets is engaged in the rolling stand and a trailing end of the one billet and a leading end of another billet are enclosed in a mold with the ends longitudinally spaced. This space between the ends is filled with molten metal in contact with the ends of the billets and the molten metal is hardened to interconnect the billet ends. Then the mold is removed from around the billet ends.

The molten metal in accordance with the invention is of substantially the same composition as the billets. Furthermore the one billet is advanced in a travel direction by means of the stand and the mold and the other billet are advanced synchronously with the one billet after enclosing the billet ends in the mold. The mold is removed from the billet ends before the hardened metal between the billet ends enters the rolling stand.

To impart the desired cross-section shape to the metal body bonding together the two billets and eliminate any sprue, the mold is displaced relative to the billets during hardening of the metal in the space so as to conform a section of the metal in the space with the billets. This can be done by moving the mold faster or slower than the billets it is splicing or even by reciprocating it back and forth across the joint to in effect wipe it clean. The billet ends are descaled before being engaged in the mold to make the bond with the metal body between them as strong as possible. Similarly the interior of the two-piece mold is also normally cleaned between splicing operations.

The space between the billet ends is filled to impart to the metal in the space a cross section substantially identical to a cross section of the billets. To do this the metal is filled into the space under superatmospheric pressure. In addition since the metal in the space contracts as it hardens more of the metal is added to the space to fill any voids therein created by the contraction of the metal in the space.

An apparatus for making metal bars from elongated billets cut from a continuously cast strand has according to the invention a rolling stand engaging one of the billets, a mold enclosing a trailing end of the one billet and a leading end of another billet with the ends longitudinally spaced, and means for filling a space in the mold between the billets with molten metal in contact with the ends of the billets so that as the molten metal hardens it interconnects the billet ends.

A support carries the mold and is coupled to the one billet for synchronous longitudinal movement therewith. Means is provided for displacing the mold longitudinally relative to the support. The mold has a cavity corresponding complementarily to cross sections of the billet ends.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
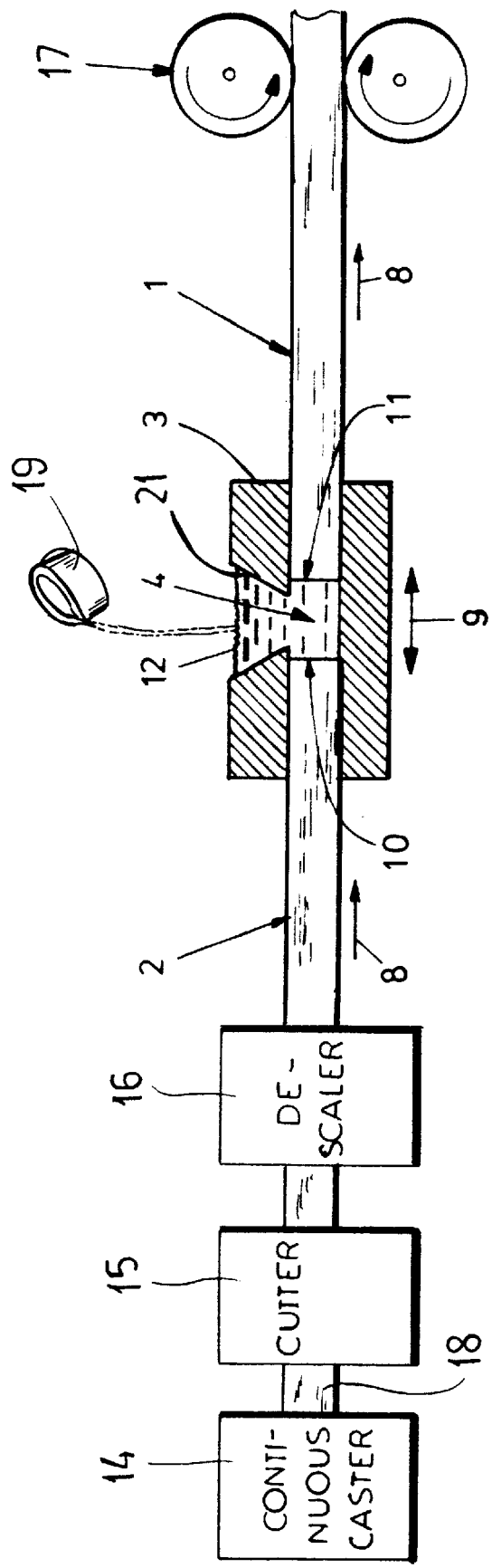
FIG. 1 is a partly schematic side view illustrating the method of this invention.
Figure 2:
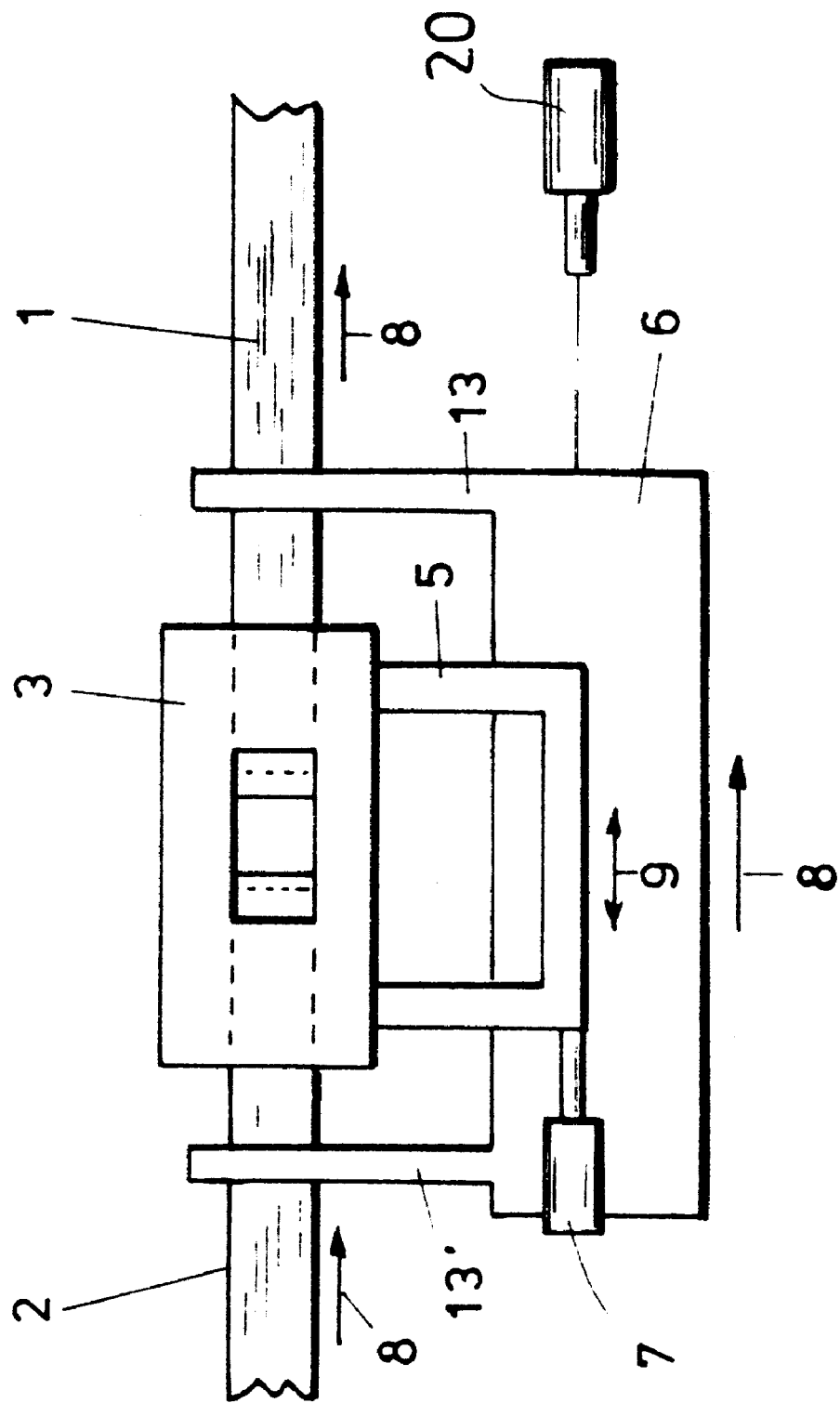
FIG. 2 is a top view of the system of FIG. 1.

As seen in FIGS. 1 and 2 a continuous strand 18 issues from a continuous-casting device 14 and is longitudinally subdivided by a cutting apparatus 15 into billets, one of which is shown at 1 and another of which is shown at 2. Normally the billets 1 and 2 are of steel and may eventually be formed for example into concrete reinforcement bars, to which end the billets are passed through a rolling mill whose furthest upstream roll stand is illustrated schematically at 17. As is standard, the billets 1 and 2 are not all of the same length since at least the last billet cut from the strand 18 is normally short.

According to the invention when one of the billets 1 is gripped in the rolling stand 17 and advanced at a slow speed in a longitudinal direction 8 its trailing end 11 and the leading end 10 of the other billet 2 are enclosed in a two-piece mold 3 having a cavity 4 that is of the same cross-sectional shape and size as the two billets 1 and 2. This cavity or space 4 is filled with molten metal 12, here steel of the same composition as the billets 1 and 2 from a supply indicated here as a crucible 19. As the steel in the cavity 4 contracts more metal 12 is added.

The mold 3 is supported on a slide 5 movable by an actuator 7 on a support 6 in directions 9 parallel to a direction 8 of displacement of the billets 1 and 2. The support 6 is linked by a clamp 13 to leading billet 1 and by another such clamp 13' to the trailing billet 2 so that this support 8 will move synchronously with the billet 1 and will in fact entrain the billet 2 for similar synchronous movement and the crucible 19 can if necessary also be moved synchronously with the billet 1. A separate actuator 20 may be provided instead of or in addition to the clamp 13 to insure synchronous longitudinal movement.

As the metal 12 in the space 4 hardens the mold 3 is stroked back and forth so as to cut off the sprue or runner forming in the fill hole 21 and to impart to the mass of metal that hardens between the ends 10 and 11 a cross-sectional shape identical to that of the billets 1 and 2. To ensure good adhesion of the metal 12 to the ends 10 and 11 they are normally cleaned in a descaling apparatus 16. Otherwise the fact that the metal 12 is of the same composition as the billets 1 and 2 normally ensures good bonding.

Since the composition and cross-sectional shape of the body of metal bonding together the two ends 10 and 11 is identical to that of the billets 1 and 2, after rolling the splice or seam thus produced is undetectable. In addition since the billets are in effect formed back into an endless strand by the splicing system of this operation, they can be cut into trade length with no waste whatsoever.

We claim:

1. In a method of making metal bars wherein a continuously cast strand is cut into elongated billets having ends and the billets are run through a rolling stand, the improvement comprising the steps after cutting the strand into billets and before rolling the billets of sequentially:

engaging one of the billets in the rolling stand;

enclosing a trailing end of the one billet and a leading end of another billet in a mold with the ends longitudinally spaced;

filling a space in the mold between the billets with molten metal in contact with the ends of the billets;

hardening the metal in the space and thereby interconnecting the billet ends while relatively longitudinally displacing the billets and the mold to conform a section of the metal in the space with a section of the billets; and removing the mold from around the billet ends.

2. The bar-making method defined in claim 1 wherein the molten metal is of substantially the same composition as the billets.

3. The bar-making method defined in claim 1, further comprising the step before enclosing the billet ends of descaling the billet ends.

4. The bar-making method defined in claim 1 wherein the space between the billet ends is filled to impart to the metal in the space a cross section substantially identical to a cross section of the billets.

5. The bar-making method defined in claim 1 wherein the metal in the space contracts as it hardens, the method further comprising the step of adding more of the metal to the space to fill any voids therein created by the contraction of the metal in the space.

6. An apparatus for making metal bars from elongated billets cut from a continuously cast strand, the apparatus comprising a rolling stand engaging one of the billets;

a mold enclosing a trailing end of the one billet and a leading end of another billet with the ends longitudinally spaced and having a cavity corresponding complementarily to cross sections of the billet ends;

means for filling a space in the mold between the billets with molten metal in contact with the ends of the billets, whereby as the molten metal hardens it interconnects the billet ends; and means for relatively displacing the mold and the billets while the cavity is filled with molten metal and as the molten metal hardens to form between the billet ends a hardened metal body of a cross-sectional shape identical to that of the billet ends.

7. The bar-making apparatus defined in claim 6, further comprising a support carrying the mold.

8. The bar-making apparatus defined in claim 6 wherein the mold has a cavity corresponding complementarily to cross sections of the billet ends.

9. In a method of making metal bars wherein a continuously cast strand is cut into elongated billets having ends and the billets are run through a rolling stand, the improvement comprising the steps after cutting the strand into billets and before rolling the billets of sequentially:

engaging one of the billets in the rolling stand;

enclosing a trailing end of the one billet and a leading end of another billet in a mold with the ends longitudinally spaced;

filling a space in the mold between the billets with molten metal in contact with the ends of the billets;

hardening the metal in the space and thereby interconnecting the billet ends;

removing the mold from around the billet ends; and relatively longitudinally displacing the billets and the mold during hardening of the metal in the space and thereby conforming a section of the metal in the space with the billets.

10. The bar-making method defined in claim 9, further comprising the steps of:

advancing the one billet slowly in a travel direction by means of the stand; and advancing the mold and the other billet synchronously with the one billet after enclosing the billet ends in the mold, the mold being removed from the billet ends before the hardened metal between the billet ends enters the rolling stand.

* * * * *